(12) United States Patent
Wu (10) Patent No.: US 7,946,642 B1
(45) Date of Patent: May 24, 2011

(54) MOTORCYCLE WINDSHIELD ASSEMBLY

(75) Inventor: Yong-Yuan Wu, Tainan (TW)

(73) Assignee: Yuan-Hwen Cadtool Industrial Co., Ltd., Tainan (TW)

( * ) Notice: Subject to any disclaimer, the term of this patent is extended or adjusted under 35 U.S.C. 154(b) by 82 days.

(21) Appl. No.: 12/612,717

(22) Filed: Nov. 5, 2009

(51) Int. Cl.
*B62J 17/04* (2006.01)

(52) U.S. Cl. .......... 296/78.1; 296/89; 296/92; 296/96.2; 296/96.21

(58) Field of Classification Search .......... 296/78.1, 296/84.1, 89, 92, 96.2, 96.21, 180.5
See application file for complete search history.

(56) References Cited

U.S. PATENT DOCUMENTS

| | | | | |
|---|---|---|---|---|
| 5,732,965 | A * | 3/1998 | Willey | 280/288.4 |
| 5,845,955 | A * | 12/1998 | Willey | 296/78.1 |
| 6,234,554 | B1 * | 5/2001 | Willey | 296/78.1 |
| 6,293,606 | B1 * | 9/2001 | Jarosz et al. | 296/78.1 |
| 6,505,877 | B1 * | 1/2003 | Devlin et al. | 296/78.1 |
| 6,789,835 | B2 * | 9/2004 | Wargin et al. | 296/78.1 |
| 6,974,175 | B2 * | 12/2005 | Willey | 296/78.1 |
| 7,458,626 | B1 * | 12/2008 | Stadnyk | 296/78.1 |
| 7,552,960 | B2 * | 6/2009 | Yoshitake et al. | 296/78.1 |
| 7,604,279 | B2 * | 10/2009 | Masuda et al. | 296/78.1 |
| 7,832,783 | B1 * | 11/2010 | Stadnyk | 296/78.1 |
| 7,878,571 | B2 * | 2/2011 | Misaki et al. | 296/78.1 |
| 2009/0195011 | A1 * | 8/2009 | Tsuda et al. | 296/78.1 |

* cited by examiner

*Primary Examiner* — Glenn Dayoan
*Assistant Examiner* — Gregory Blankenship
(74) *Attorney, Agent, or Firm* — Alan Kamrath; Kamrath & Associates PA (57) ABSTRACT

A motorcycle windshield assembly includes two frame units coupled to a windshield. Each frame unit includes a pair of corresponding adjusting elements jointly enclosing an end of an installation rod. Each pair of the adjusting elements are fitted into receiving spaces of a corresponding pair of left and right covers such that teeth formed on each pair of the adjusting elements mesh with teeth formed in the corresponding pair of left and right covers. Each pair of the left and right covers have a side provided with guide grooves for receiving a sliding element coupled to the windshield. Thus, the windshield coupled to the frame units can be conveniently raised, lowered, or tilted to provide the desired shielding effect. The motorcycle windshield assembly is flexibly adjustable in height and tilt angle and is collapsible when not in use.

3 Claims, 11 Drawing Sheets

MOTORCYCLE WINDSHIELD ASSEMBLY

BACKGROUND OF THE INVENTION

1. Technical Field

The present invention relates to motorcycle windshield assemblies and, more particularly, to a motorcycle windshield assembly installed at a front end of a motorcycle and including a windshield that can be easily raised, lowered, or tilted to provide the desired shielding effect, thus rendering the motorcycle windshield assembly flexibly adjustable in height and tilt angle and collapsible when not in use.

2. Description of Related Art

Figure 1:
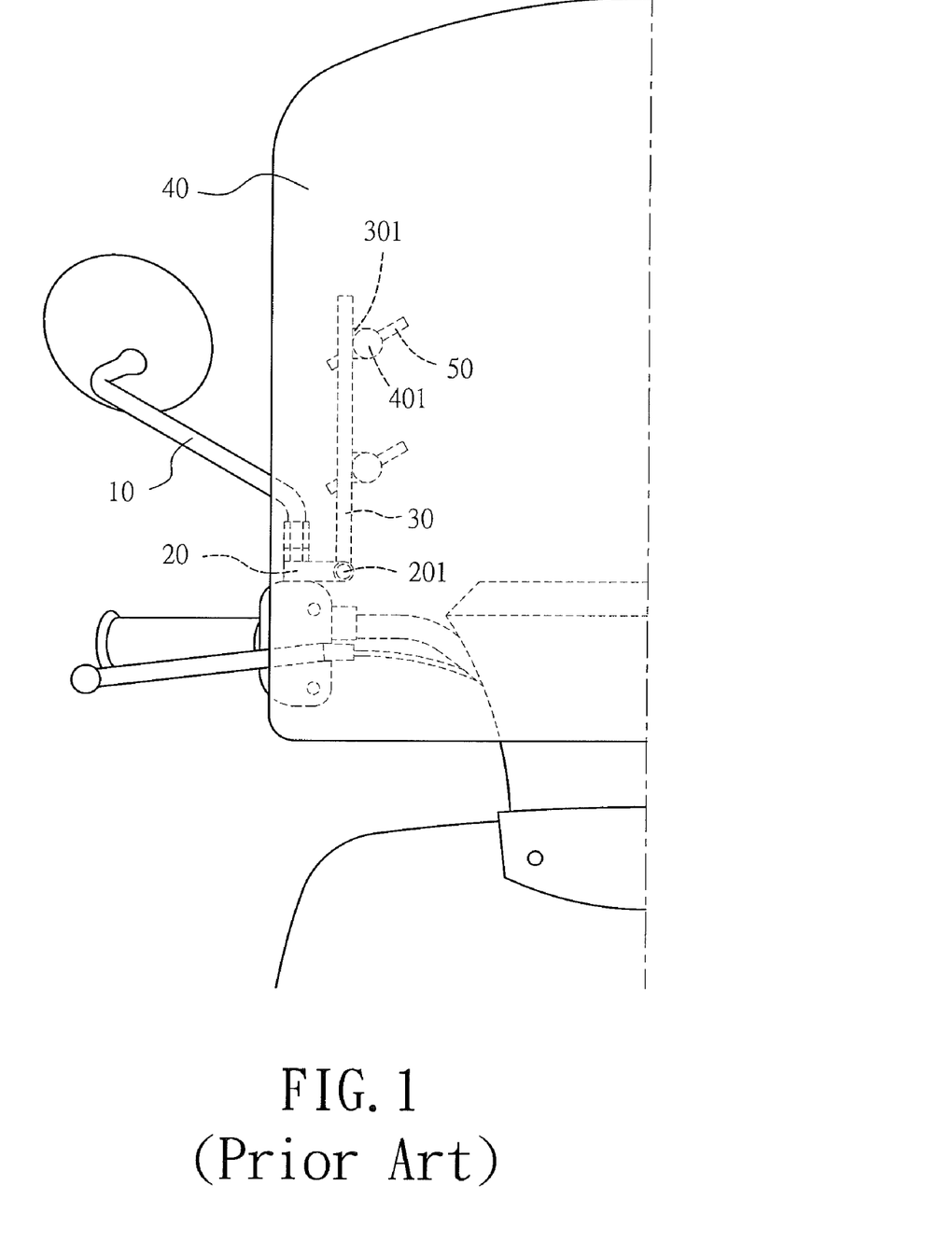
FIG. 1 is a front view of a conventional motorcycle windshield assembly.

Referring to FIG. 1, a conventional motorcycle windshield assembly is installed at a front end of a motorcycle typically in the following manner. Fixing elements 20 having threaded locking portions 201 are fixed in position to left and right rear-view mirrors 10 of the motorcycle, respectively. Next, the threaded locking portion 201 of each fixing element 20 is coupled with an end of a left or right supporting element 30, thus forming a 90° angle between the corresponding fixing element 20 and supporting element 30. Each supporting element 30 has a projecting portion 301, which is subsequently brought into contact with a corresponding positioning portion 401 of a windshield 40 and then fastened threadingly to the corresponding positioning portion 401 of the windshield 40 by a wing screw 50. Thus, the windshield 40 is mounted between the rear-view mirrors 10 of the motorcycle to shield its driver from wind, flying sand, or insects coming from the front while the motorcycle is running. However, the windshield 40 once installed is fixed in position and cannot be adjusted to provide the shielding effect needed at the moment. For example, if the wind, flying sand, or insects are coming from a greater height, the windshield 40 may not function as expected.

BRIEF SUMMARY OF THE INVENTION

The present invention aims to overcome the inconveniences of an existing motorcycle windshield assembly installed between left and right rear-view mirrors of a motorcycle, with a view to providing a motorcycle windshield assembly whose windshield can be easily raised, lowered, or tilted according to the need of shielding and which is flexibly adjustable in height and tilt angle and collapsible when not in use.

Therefore, it is a primary objective of the present invention to provide a motorcycle windshield assembly to be installed at a front end of a motorcycle, wherein the motorcycle windshield assembly includes a windshield and two frame units, each frame unit including a pair of corresponding adjusting elements and a pair of corresponding left and right covers configured for receiving the pair of adjusting elements. Each adjusting element has an inner side concavely provided with a groove for receiving an end of an installation rod. Each adjusting element further has a lateral side peripherally formed with teeth. Each pair of the adjusting elements are coupled together to enclose the end of the corresponding installation rod. Each pair of the left and right covers have an end concavely provided with receiving spaces configured for receiving the corresponding pair of adjusting elements. The receiving spaces of each pair of the left and right covers have predetermined sections formed with teeth for meshing with the teeth of the corresponding pair of adjusting elements. Each pair of the left and right covers further have an opposite end provided with predetermined spaces in which a resilient element is received in a compressed state. After each pair of the adjusting elements that enclose the end of the corresponding installation rod is fitted into the corresponding pair of the left and right covers, each pair of the left and right covers are fastened with a threaded fastener and a screw nut so as to complete the frame units. The completed frame units are coupled with the windshield such that the windshield can be tilted to a desired shielding angle or be collapsed when not in use.

It is a second objective of the present invention to provide a motorcycle windshield assembly to be installed at a front end of a motorcycle, wherein the motorcycle windshield assembly includes a windshield and two frame units, each frame unit including a sliding element attached to an end of a positioning portion of the windshield, and a pair of corresponding left and right covers. Each pair of the left and right covers have a side concavely provided with guide grooves for receiving the corresponding sliding element. Each sliding element has an inner side provided with an engaging portion peripherally formed with a plurality of convex surfaces. Each sliding element further has an outer side extended with a projecting portion for engaging with the corresponding positioning portion of the windshield. Each sliding element is coupled to the windshield by a plurality of threaded fasteners. Each pair of the left and right covers have an end provided with predetermined spaces in which a resilient element is received in a compressed state. After each sliding element coupled with the windshield is fitted into the corresponding pair of left and right covers, and an installation rod is coupled to each pair of the left and right covers, each pair of the left and right covers are fastened with a threaded fastener and a screw nut. Thus, the windshield can be raised or lowered to provide the desired shielding effect.

It is a third objective of the present invention to provide a motorcycle windshield assembly, wherein the motorcycle windshield assembly includes a windshield and two frame units coupled to the windshield, each frame unit including an installation rod whose lower end is threadingly fixed in position to an adapter plate. Each adapter plate is composed of a locking nut and an extension portion. The extension portion of each adapter plate has an end penetrated by a hole capable of being inserted by and coupled with rear-view mirrors of different specifications.

BRIEF DESCRIPTION OF THE SEVERAL VIEWS OF THE DRAWINGS

The structure and the technical means adopted by the present invention to achieve the above and other objectives can be best understood by referring to the following detailed description of an illustrative embodiment and the accompanying drawings, in which.

DETAILED DESCRIPTION OF THE INVENTION

Figure 2:
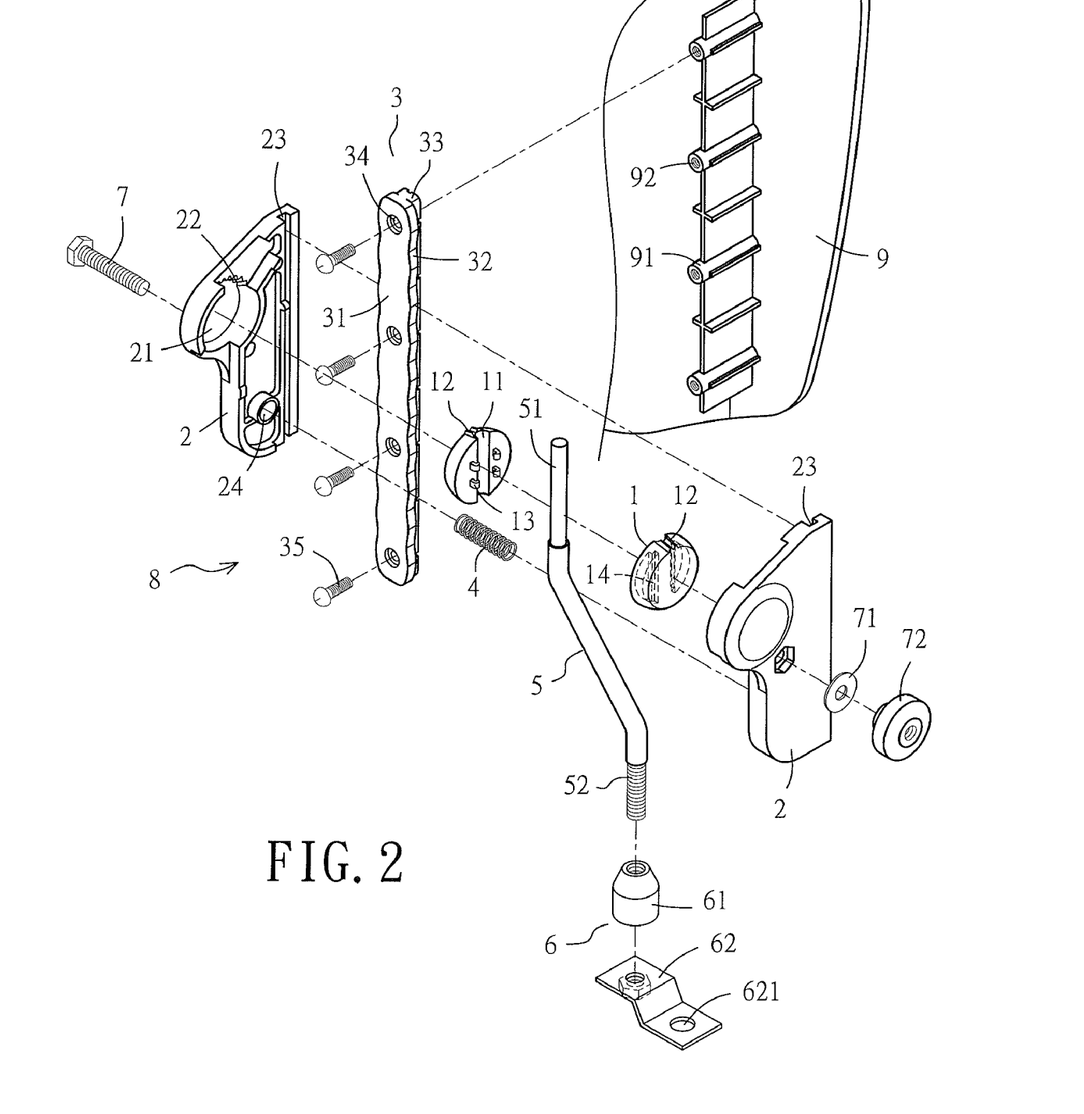
FIG. 2 is an exploded perspective view of a motorcycle windshield assembly according to the present invention.

Referring to FIG. 2, a motorcycle windshield assembly according to an embodiment of the present invention includes two frame units 8 coupled bilaterally to a windshield 9. Each frame unit 8 includes a pair of corresponding adjusting elements 1, a pair of corresponding left and right covers 2, a sliding element 3, a resilient element 4, an installation rod 5, an adapter plate 6, a threaded fastener 7, a washer 71, and a screw nut 72.

Each adjusting element 1 is formed of a tough plastic and has an inner side concavely provided with a groove 11. Each adjusting element 1 further has a lateral side peripherally formed with teeth 12. One of each pair of the adjusting elements 1 is protrudingly provided with hooks 13 that are arranged on two sides of the groove 11. The other of each pair of the adjusting elements 1 is formed with recesses 14 corresponding in position to the hooks 13 of the corresponding adjusting element 1 so that the two corresponding adjusting elements 1 can be coupled together via engagement between the hooks 13 and the recesses 14.

Each pair of the left and right covers 2 are formed of a tough plastic and have an end concavely provided with receiving spaces 21 for receiving the corresponding pair of adjusting elements 1. The receiving spaces 21 of each pair of the left and right covers 2 have predetermined sections formed with teeth 22 corresponding in position to, and configured for meshing with, the teeth 12 of the corresponding pair of adjusting elements 1, wherein the teeth 22 must outnumber the corresponding teeth 12. Each cover 2 has a side concavely provided with a guide groove 23. Each cover 2 further has a lower end provided with a space 24.

Each sliding element 3 is made of a touch plastic and has an inner side provided with an engaging portion 31 peripherally formed with a plurality of convex surfaces 32. Each sliding element 3 further has an outer side extended with a projecting portion 33 for engaging with a corresponding positioning portion 91 of the windshield 9. The engaging portion 31 of each sliding element 3 has a surface penetrated by a plurality of holes 34.

Each installation rod 5 is a rod configured for installing the windshield 9. Each installation rod 5 has an upper section and a lower section, wherein the upper section has a relatively small outer diameter and serves as an enclosed section 51, and the lower section is formed as a threaded section 52.

Each adapter plate 6 is composed of a locking nut 61 and an extension portion 62, wherein the locking nut 61 is internally provided with a threaded hole, and the extension portion 62 has an end penetrated by a hole 621 capable of being inserted by and coupled with rear-view mirrors of different specifications.

Figure 10:
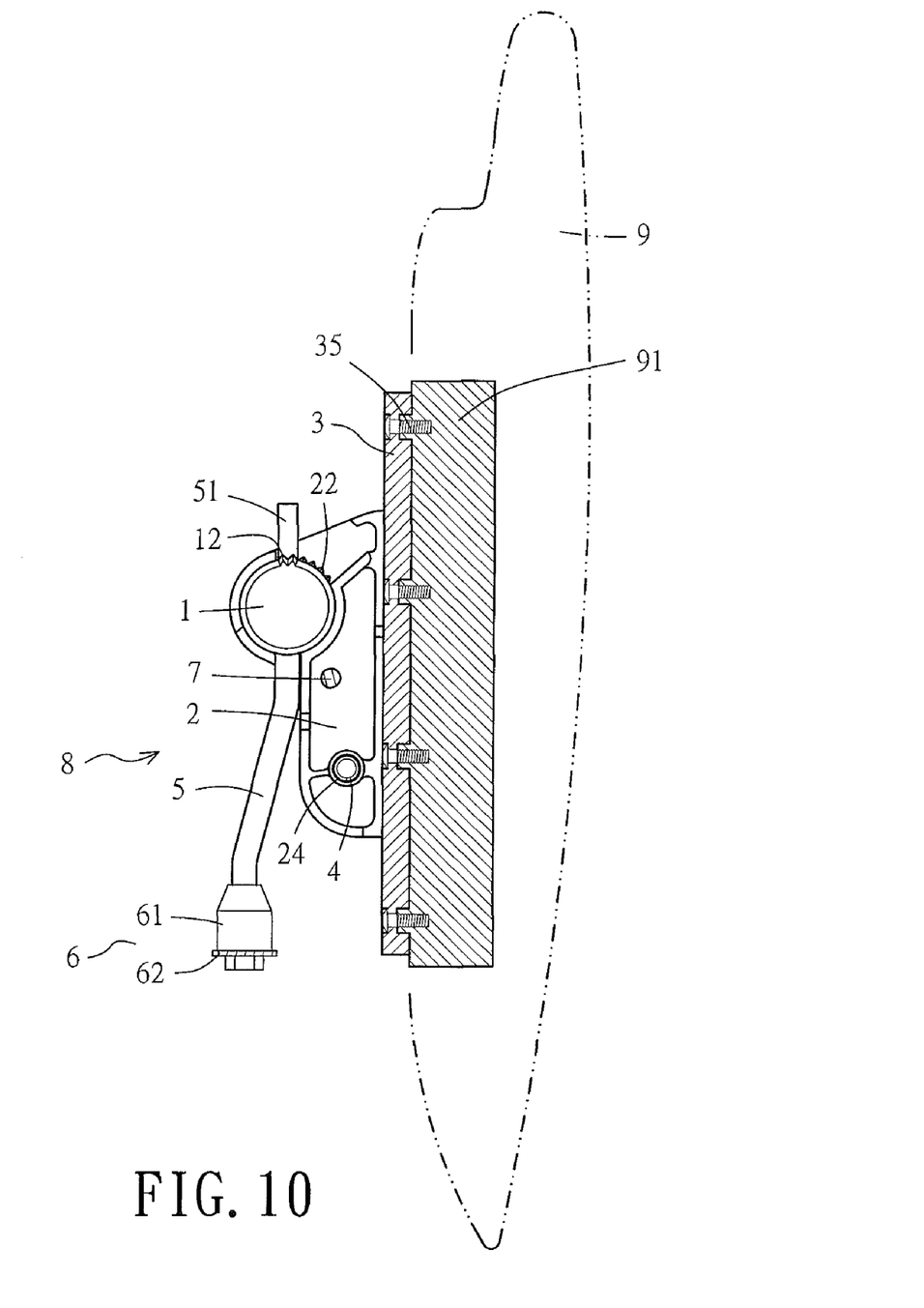
FIG. 10 is a partially sectional side elevation of the motorcycle windshield assembly according to the present invention.

Referring to FIG. 2 and FIG. 10, each frame unit 8 is assembled in the following manner from two corresponding adjusting elements 1, corresponding left and right covers 2, one sliding element 3, one resilient element 4, one installation rod 5, and one adapter plate 6. To begin with, the enclosed portion 51 of the installation rod 5 is fitted into the grooves 11 formed on the inner sides of the two corresponding adjusting elements 1. Then, the hooks 13 on one of the two adjusting elements 1 are engaged with the recesses 14 of the other adjusting element 1 such that the two adjusting elements 1 are coupled together.

Next, the projecting portion 33 on the outer side of the sliding element 3 is brought into contact with the corresponding positioning portion 91 of the windshield 9 so as for a plurality of threaded fasteners 35 to pass through the holes 34 of the sliding element 3 and then enter threaded holes 92 of the corresponding positioning portion 91 of the windshield 9, respectively, thereby fastening the sliding element 3 to the windshield 9. After that, the engaging portion 31 of the sliding element 3, which is now coupled with the windshield 9, is fitted into the corresponding guide grooves 23 of the corresponding left and right covers 2 such that the convex surfaces 32 peripherally formed on the engaging portion 31 of the sliding element 3 press against the guide grooves 23 of the two corresponding covers 2.

At the same time, the two corresponding adjusting elements 1 coupled with the installation rod 5 are fitted into the receiving spaces 21 of the left and right covers 2, thus allowing the teeth 12 of the two adjusting elements 1 to mesh with the teeth 22 formed on the predetermined sections of the receiving spaces 21 of the left and right covers 2. Afterward, the resilient element 4 is put into the spaces 24 at the lower ends of the left and right covers 2 such that the resilient element 4 is compressed. Then, the threaded fastener 7 is passed through the left and right covers 2 and connected with the washer 71 and the screw nut 72, thereby completing the assembly of one frame unit 8, as shown in FIG. 3.

The resilient elements 4 function as follows. When it is desired to adjust the frame units 8, the screw nuts 72 must be properly loosened. At that time, each resilient element 4 supports the corresponding left and right covers 2 to thereby prevent the corresponding pair of adjusting elements 1, as well as the corresponding sliding element 3 coupled with the windshield 9, from falling off the left and right covers 2.

Figure 3:
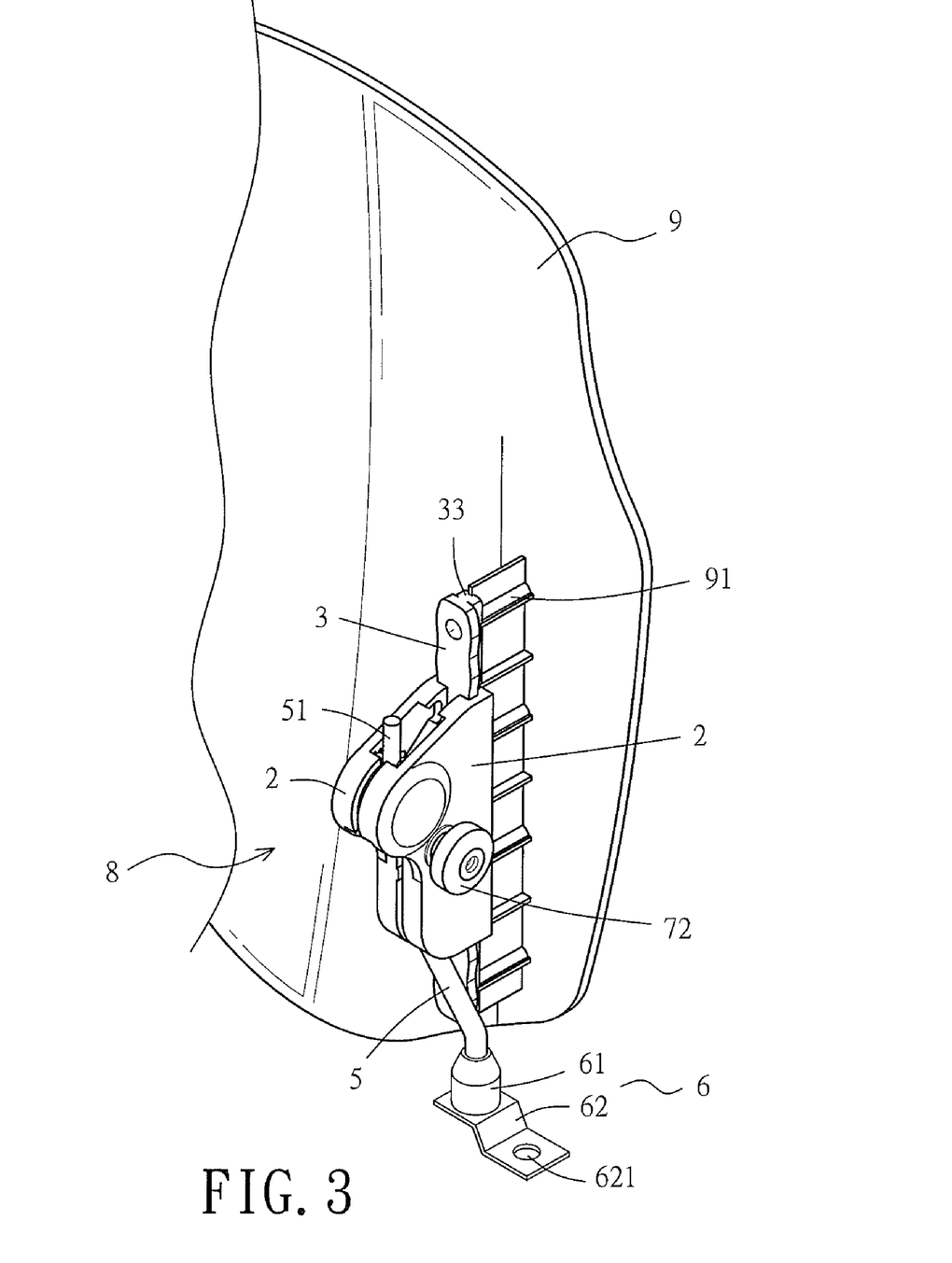
FIG. 3 is a rear perspective view of the motorcycle windshield assembly according to the present invention.
Figure 4:
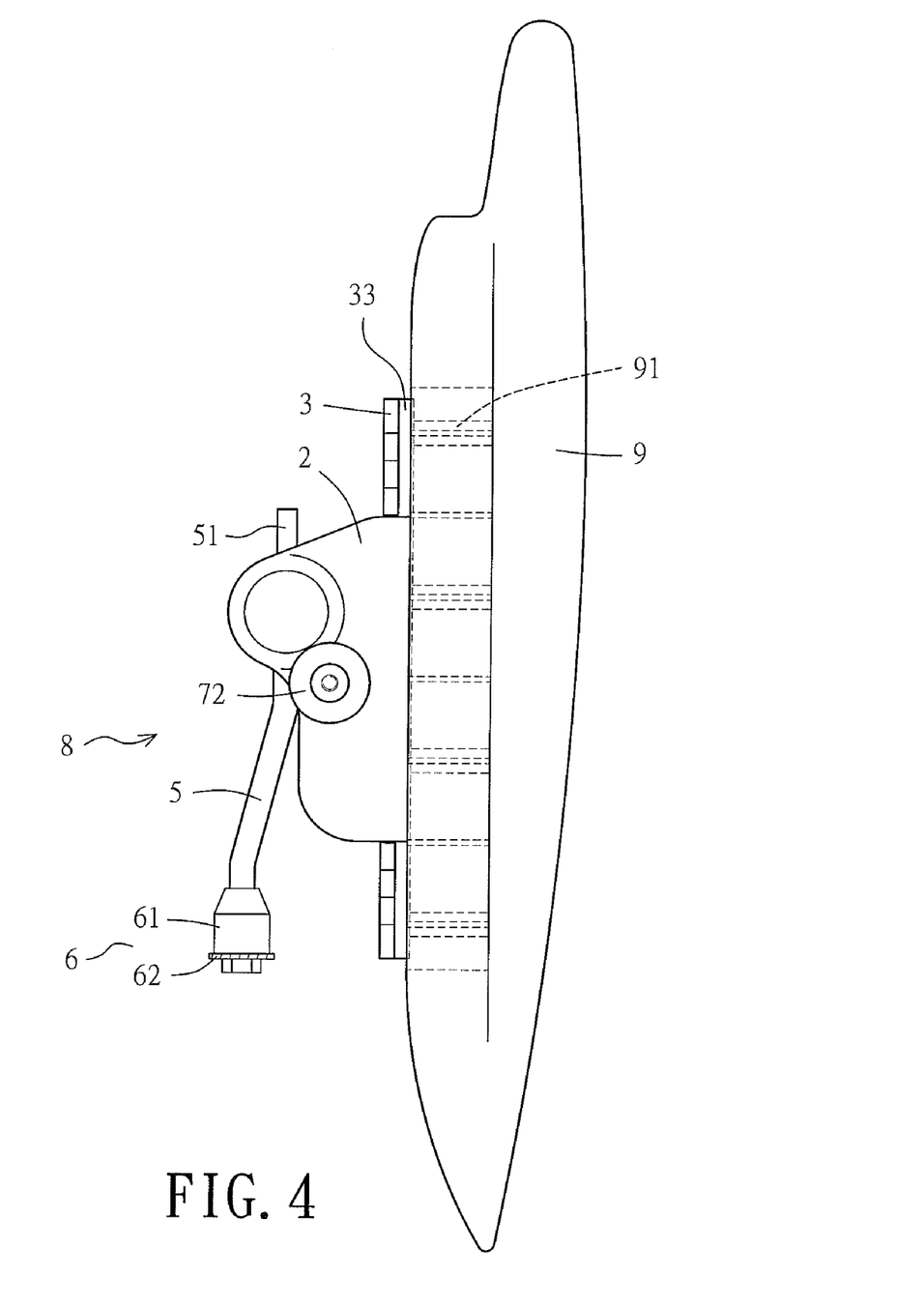
FIG. 4 is a side elevation of the motorcycle windshield assembly according to the present invention.
Figure 5:
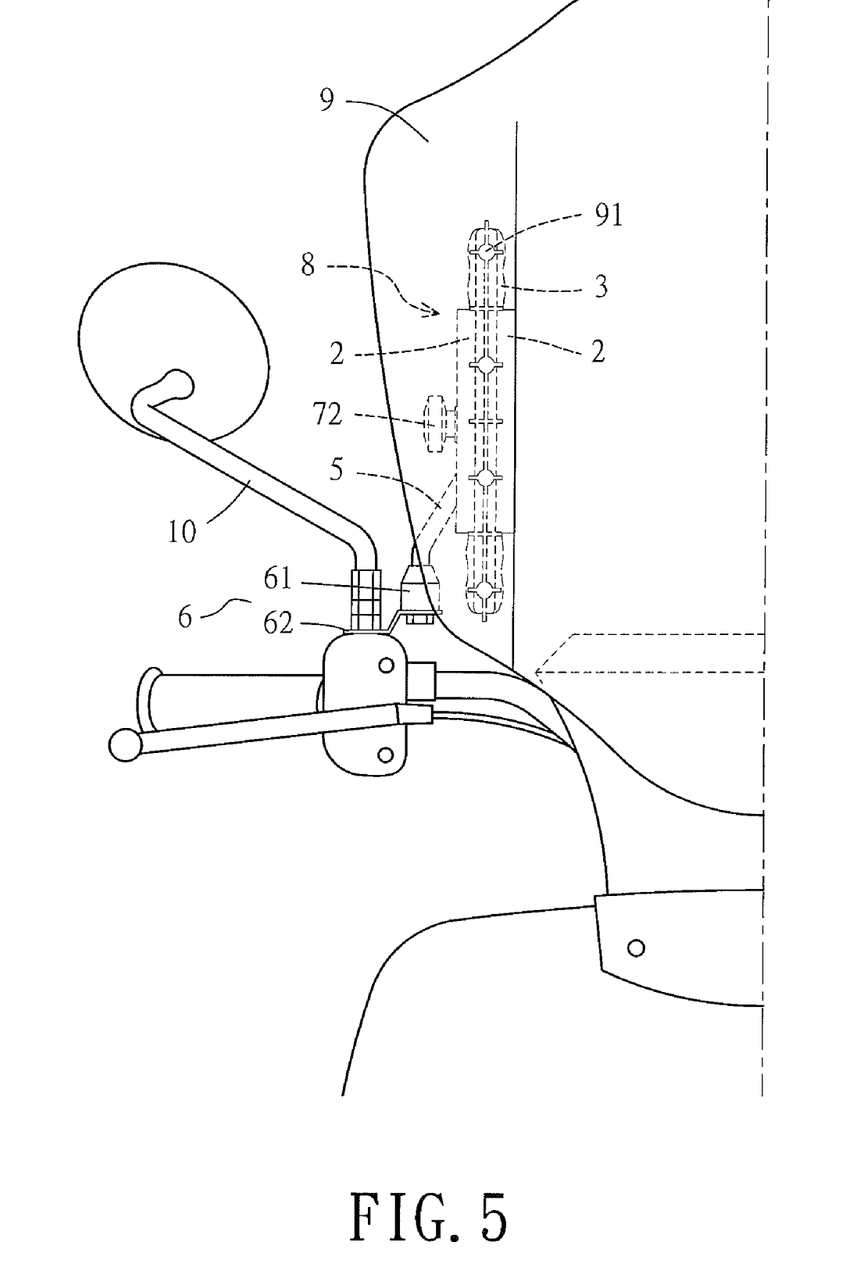
FIG. 5 shows the motorcycle windshield assembly of the present invention when installed at rear-view mirrors of a motorcycle.

After the frame units 8 are coupled to the windshield 9, the lower end of each installation rod 5 is threadingly coupled to the corresponding adapter plate 6 by the locking nut 61 thereof, as shown in FIGS. 2, 3, and 4. The hole 621 of the extension portion 62 of each adapter plate 6 is subsequently inserted by and coupled with a rear-view mirror 10 of a motorcycle, as shown in FIG. 5, wherein the rear-view mirror 10 can be of different specifications.

Figure 6:
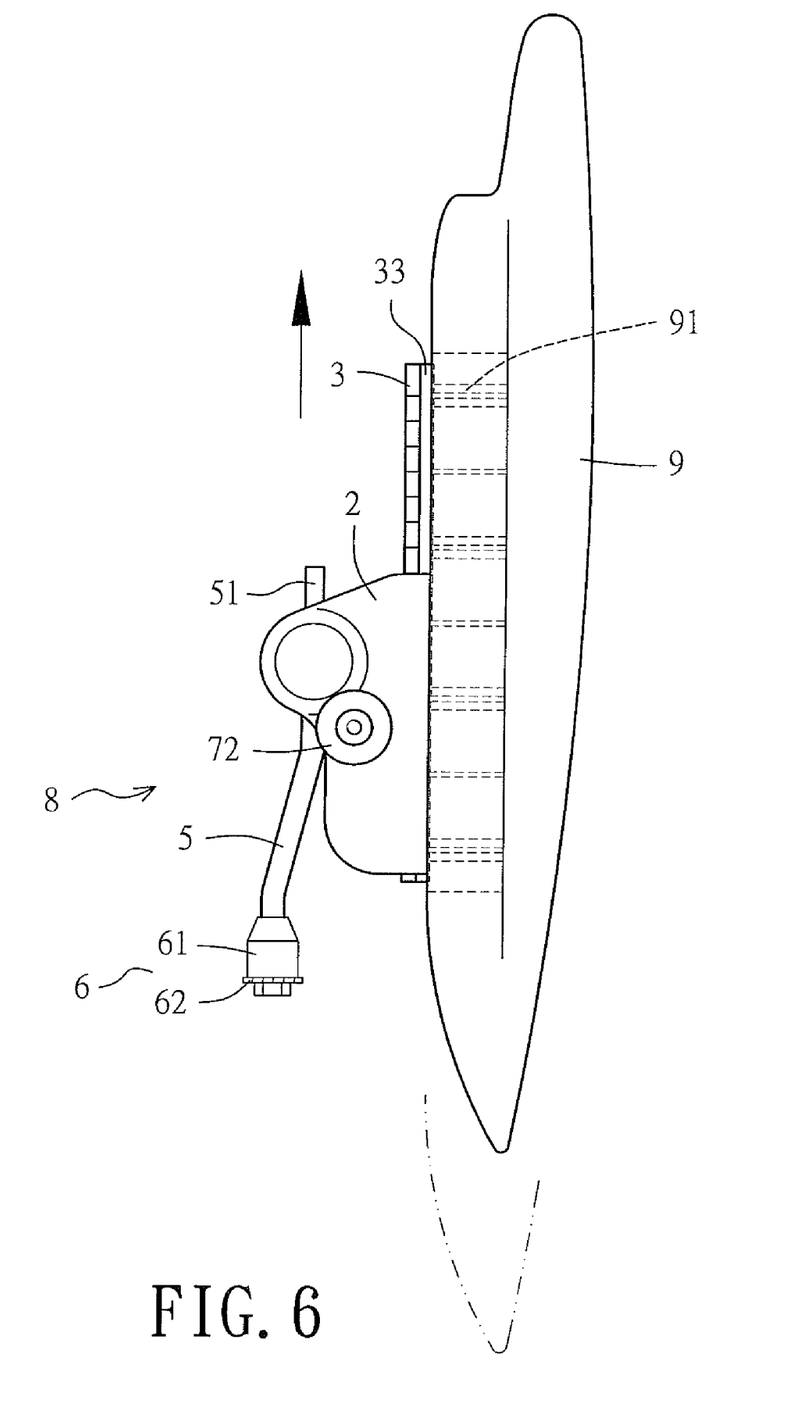
FIG. 6 is a side elevation showing a raising operation of the motorcycle windshield assembly according to the present invention.
Figure 7:
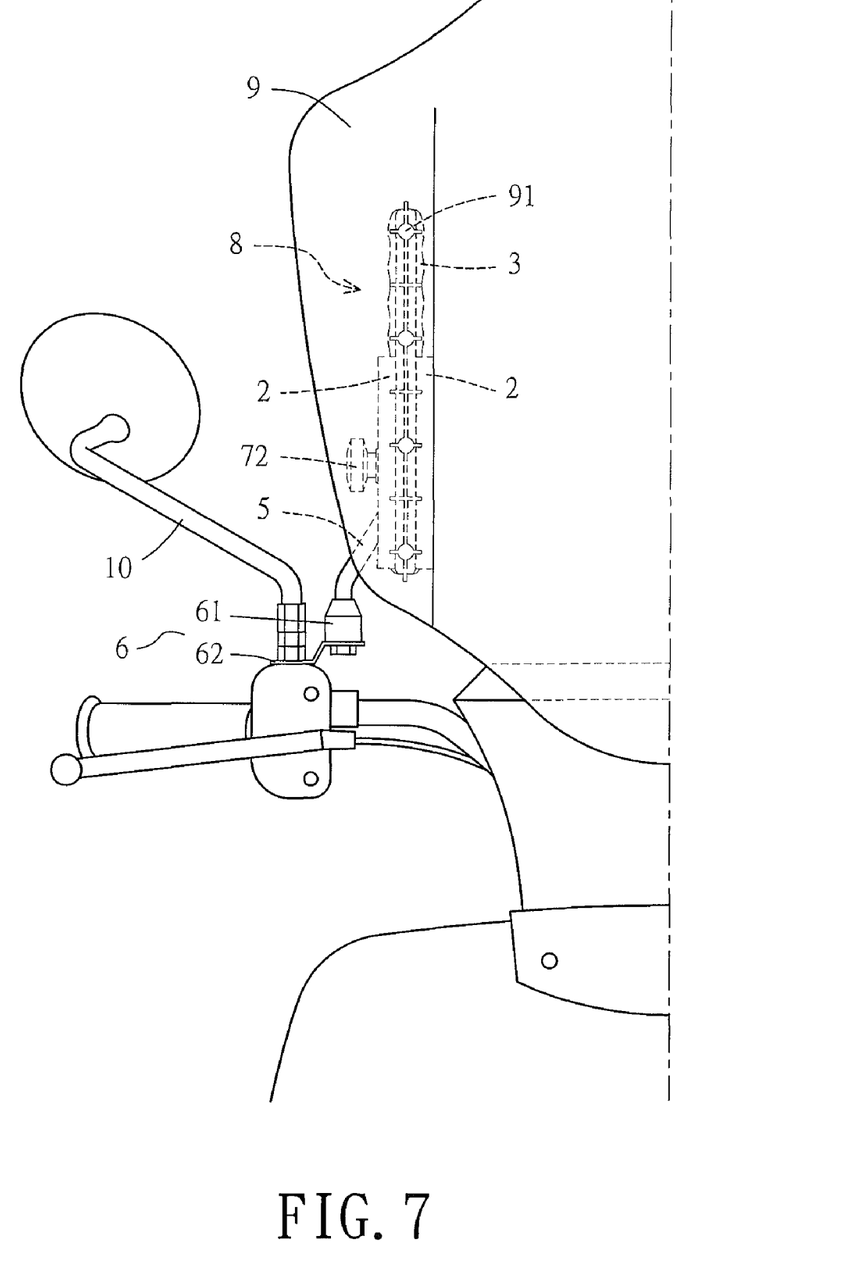
FIG. 7 is a front view showing the raising operation of the motorcycle windshield assembly according to the present invention.

Thus, the windshield 9 is installed between the left and right rear-view mirrors 10 of the motorcycle and is operable in the following manner. The windshield 9 can be raised to a height needed at the moment to ward off wind, flying sand, or insects, as shown in FIG. 6 and FIG. 7. To adjust the height of the windshield 9, a user only has to grasp an upper end of the windshield 9 by hand and pull the windshield 9 upward, i.e., in a direction indicated by the vertical arrow of FIG. 6. By dosing so, the sliding elements 3 coupled with the windshield 9 are moved upward along the guide grooves 23 of the two pairs of left and right covers 2. As soon as the windshield 9 reaches the desired height, and the upward pull is stopped, the convex surfaces 32 peripherally formed on each sliding element 3 once again press against the guide grooves 23 of the corresponding pair of covers 2.

Figure 8:
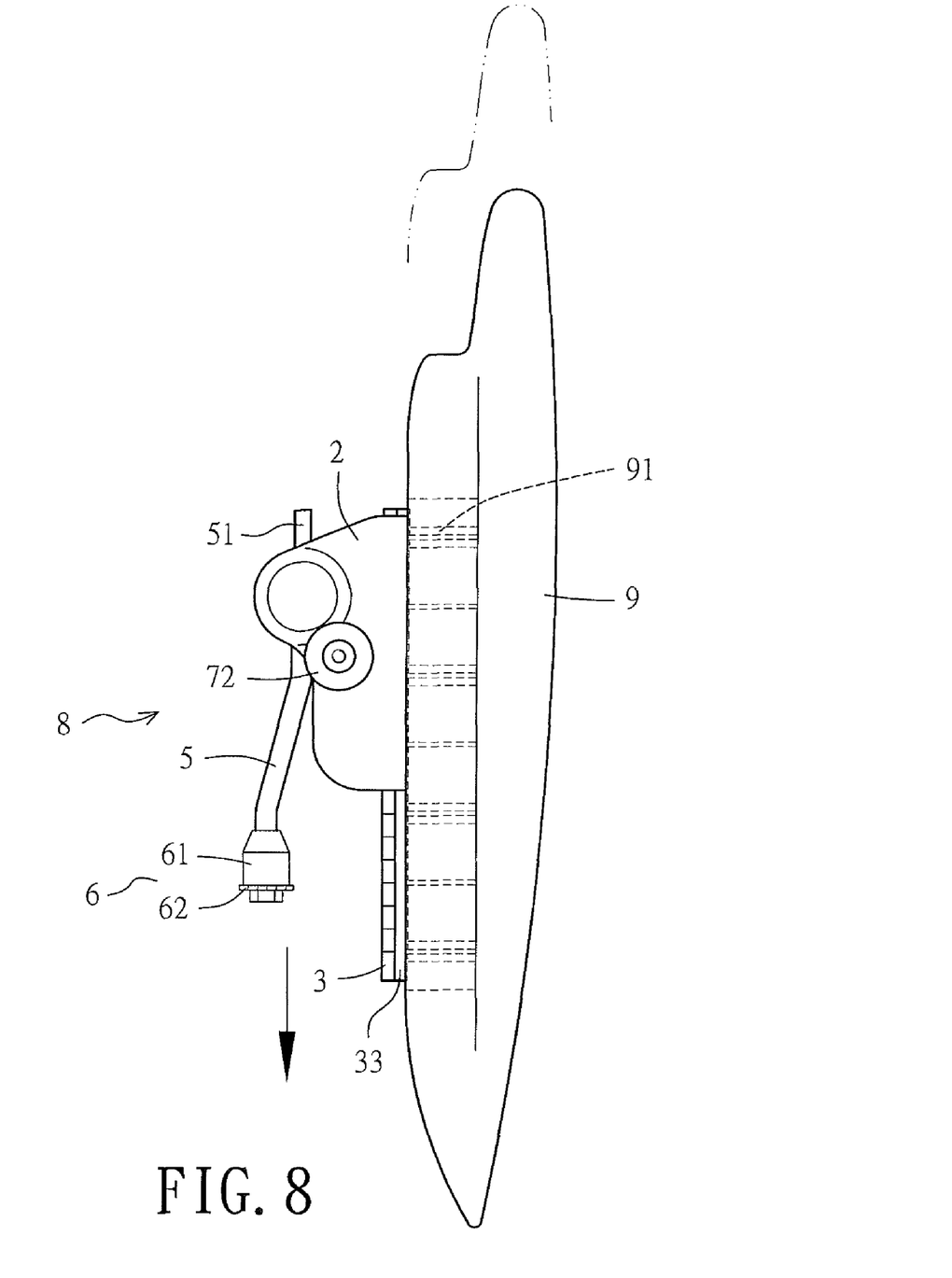
FIG. 8 is a side elevation showing a lowering operation of the motorcycle windshield assembly according to the present invention.
Figure 9:
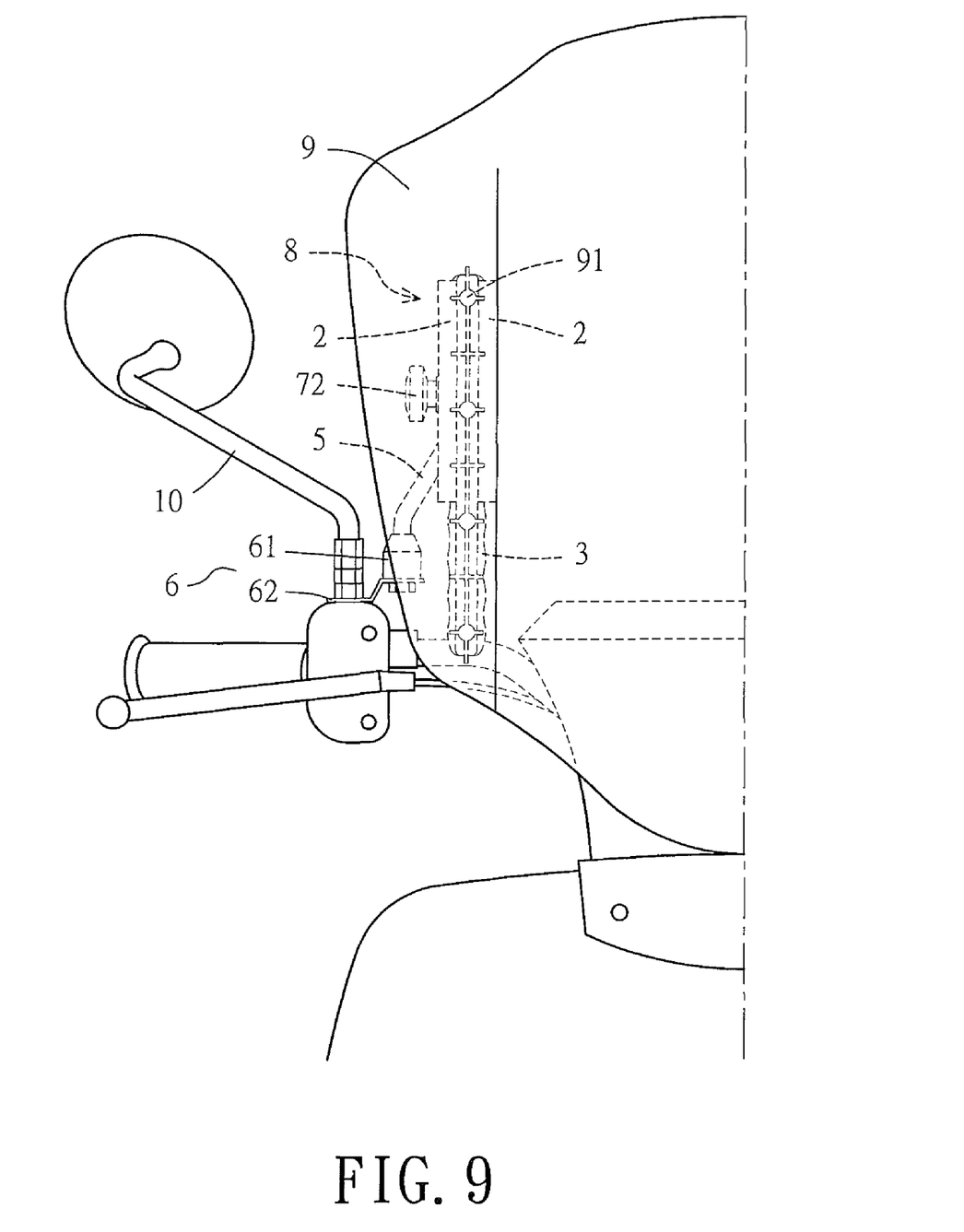
FIG. 9 is a front view showing the lowering operation of the motorcycle windshield assembly according to the present invention.

The windshield 9 installed between the left and right rear-view mirrors 10 of the motorcycle can also be lowered according to the need of shielding, as shown in FIG. 8 and FIG. 9. More specifically, the user can press at the upper end of the windshield 9 by hand and push the windshield 9 downward, i.e., in a direction indicated by the vertical arrow of FIG. 8, such that the sliding elements 3 coupled to the windshield 9 are moved downward along the guide grooves 23 of the two pairs of left and right covers 2. As soon as the windshield 9 reaches the desired position, and the downward push is stopped, the convex surfaces 32 peripherally formed on each sliding element 3 continue to press against the guide grooves 23 of the corresponding pair of covers 2.

Figure 11:
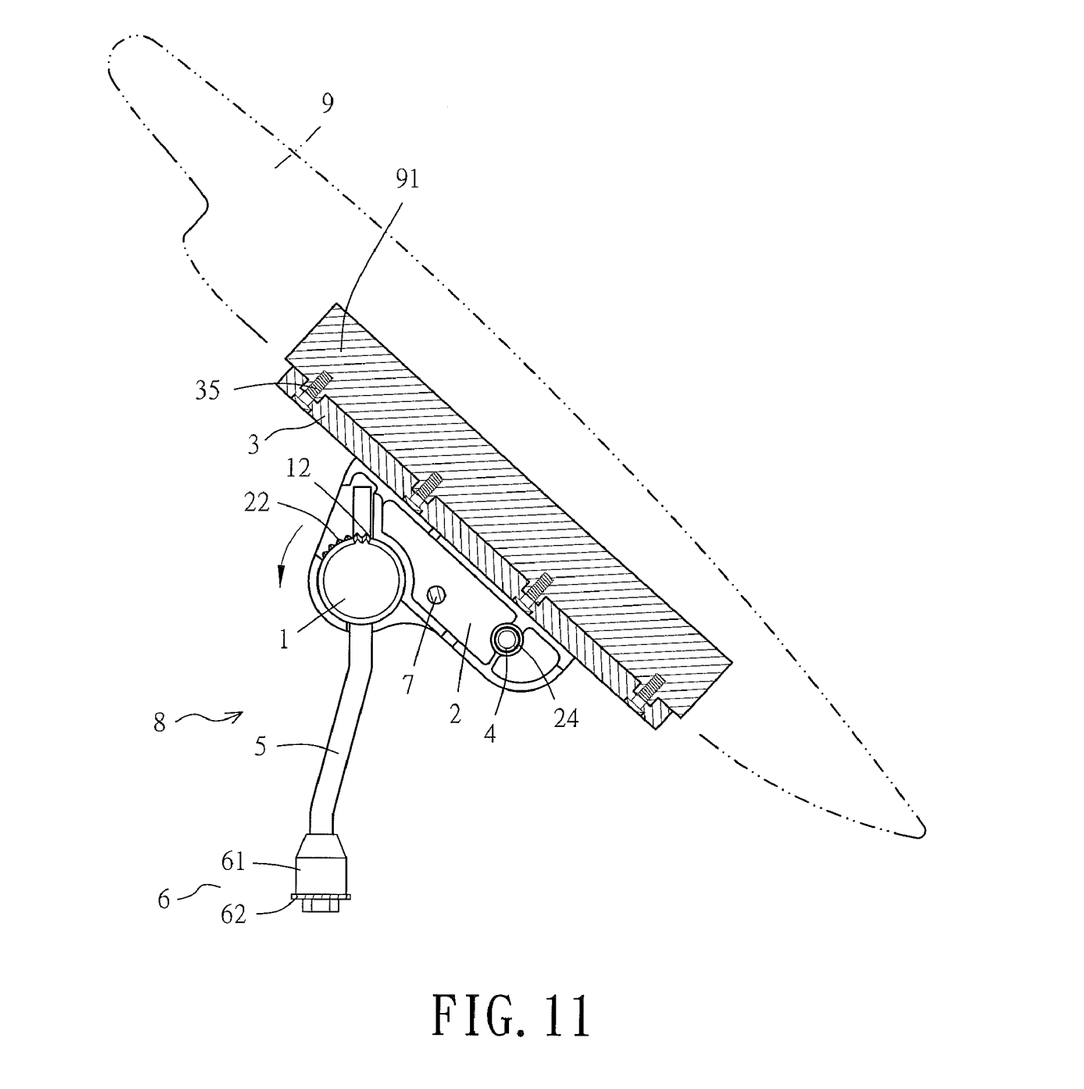
FIG. 11 is a side elevation showing a tilting operation of the motorcycle windshield assembly according to the present invention.

Referring to FIG. 10 and FIG. 11, the windshield 9 installed between the left and right rear-view mirrors 10 of the motorcycle can also be tilted to a desired angle by pressing at an outer portion of the windshield 9 and pushing the windshield 9 downward in the desired tilt direction, i.e., in a direction indicated by the solid-head arrow of FIG. 11. Thus, the teeth 22 of each pair of the left and right covers 2 coupled to the windshield 9 are moved along the teeth 12 formed on the corresponding pair of adjusting elements 1, which are coupled to the corresponding installation rod 5. When the windshield 9 is tilted to the desired angle, and the downward push is stopped, the teeth 22 of each pair of the left and right covers 2 are once again locked with the teeth 12 of the corresponding pair of adjusting elements 1. The aforesaid operation is equally applicable to collapsing the windshield 9 when it is not in use.

What is claimed is:

1. A motorcycle windshield assembly, comprising: a windshield; and two frame units installed between left and right rear-view mirrors of a motorcycle, the motorcycle windshield assembly being characterized in that:

the frame units are coupled to the windshield, and each said frame unit comprises a pair of corresponding adjusting elements and a pair of corresponding left and right covers configured for receiving the pair of adjusting elements, wherein:

each said adjusting element has an inner side concavely provided with a groove for receiving an end of an installation rod, each said adjusting element further having a lateral side peripherally formed with teeth, each pair of said adjusting elements being coupled together to enclose the end of a corresponding said installation rod;

each pair of said left and right covers have an end concavely provided with receiving spaces for receiving a corresponding pair of said adjusting elements, the receiving spaces of each pair of said left and right covers having predetermined sections formed with teeth for meshing with the teeth of a corresponding pair of said adjusting elements;

each pair of said left and right covers further have an opposite end provided with predetermined spaces in which a resilient element is received in a compressed state;

after each pair of said adjusting elements that enclose the end of a corresponding installation rod are fitted into a corresponding pair of said left and right covers, each pair of said left and right covers are fastened with a threaded fastener and a screw nut so as to complete the frame units, the completed frame units being coupled with the windshield such that the windshield can be tilted to a desired shielding angle or be collapsed when not in use; and the frame units are tilted after the screw nuts are properly loosened such that each said resilient element supports a corresponding pair of said left and right covers and thereby prevents a corresponding pair of said adjusting elements from falling off the corresponding pair of said left and right covers.

2. A motorcycle windshield assembly, comprising: a windshield; and two frame units installed between left and right rear-view mirrors of a motorcycle, the motorcycle windshield assembly being characterized in that:

the frame units are coupled to the windshield, and each said frame unit comprises a sliding element attached to an end of a positioning portion of the windshield, and a pair of corresponding left and right covers, wherein:

each pair of said left and right covers have a side concavely provided with guide grooves for receiving a corresponding said sliding element, each said sliding element having an inner side provided with an engaging portion peripherally formed with a plurality of convex surfaces, each said sliding element further having an outer side extended with a projecting portion for engaging with a corresponding said positioning portion of the windshield, each said sliding element being coupled to the windshield by a plurality of threaded fasteners;

each pair of said left and right covers have an end provided with predetermined spaces in which a resilient element is received in a compressed state;

after each said sliding element coupled with the windshield is fitted into a corresponding pair of said left and right covers, and an installation rod is coupled to each pair of said left and right covers, each pair of said left and right covers are fastened with a threaded fastener and a screw nut, so as for the windshield to be raised or lowered to provide a desired shielding effect; and the frame units are raised or lowered after the screw nuts are properly loosened such that each said resilient element supports a corresponding pair of said left and right covers and thereby prevents a corresponding said sliding element coupled to the windshield from falling off the corresponding pair of said left and right covers.

3. The motorcycle windshield assembly of claim 1 or 2, wherein the installation rod in each said frame unit coupled to the windshield has a lower end threadingly fixed in position to an adapter plate, each said adapter plate being composed of a locking nut and an extension portion, the extension portion of each said adapter plate having an end penetrated by a hole capable of being inserted by and coupled with rear-view mirrors of different specifications.

* * * * *